(12) United States Patent
Lee et al.

(10) Patent No.: US 12,217,085 B2
(45) Date of Patent: Feb. 4, 2025

(54) ELECTRONIC DEVICE INCLUDING ACCELERATORS OF HETEROGENEOUS HARDWARE TYPES FOR SCHEDULING OPERATION

(71) Applicants: SAMSUNG ELECTRONICS CO., LTD., Suwon-si (KR); Seoul National University R&DB Foundation, Seoul (KR)

(72) Inventors: Seung Wook Lee, Suwon-si (KR); Jangwoo Kim, Seoul (KR); Pyeongsu Park, Seoul (KR)

(73) Assignees: Samsung Electronics Co., Ltd., Suwon-si (KR); Seoul National University R & DB Foundation, Seoul (KR)

( * ) Notice: Subject to any disclaimer, the term of this patent is extended or adjusted under 35 U.S.C. 154(b) by 576 days.

(21) Appl. No.: 17/402,848

(22) Filed: Aug. 16, 2021

(65) Prior Publication Data

US 2022/0283851 A1 Sep. 8, 2022

(30) Foreign Application Priority Data

Mar. 3, 2021 (KR) .................. 10-2021-0028358

(51) Int. Cl.
G06F 9/48 (2006.01)
G06F 9/54 (2006.01)

(52) U.S. Cl.
CPC ............ *G06F 9/4881* (2013.01); *G06F 9/541* (2013.01)

(58) Field of Classification Search
CPC .......... G06F 9/4881; G06F 9/541; G06F 9/28; G06F 9/3017; G06F 9/3881; G06F 9/3885; G06F 13/382; G06N 3/063
See application file for complete search history.

(56) References Cited

U.S. PATENT DOCUMENTS 6,195,662 B1  2/2001  Ellis et al.
8,578,387 B1  11/2013  Mills et al.
9,032,101 B1  5/2015  Cox et al.
(Continued)

FOREIGN PATENT DOCUMENTS

CN   106453477 A  *  2/2017  ............. H04L 67/02
CN   107798117 A  *  3/2018  ............. G06F 16/22
(Continued)

OTHER PUBLICATIONS

Hanawa et al. Tightly Coupled Accelerators Architecture for Minimizing Communication Latency among Accelerators, May 20-24, 2013, https://ieeexplore.ieee.org/abstract/document/6650988, pp. 1-10 (Year: 2013).*

(Continued)

*Primary Examiner* — Meng Ai T An
*Assistant Examiner* — Hsing Chun Lin
(74) *Attorney, Agent, or Firm* — NSIP Law (57) ABSTRACT

An electronic device includes: a host processor configured to control an operation of the electronic device; accelerators of heterogeneous hardware types configured to exchange data with each other through direct communication; and a control unit configured to convert a command received from the host processor, based on a type of each of the accelerators and transfer a result of the converting to a corresponding accelerator among the accelerators.

18 Claims, 6 Drawing Sheets

(56) References Cited

U.S. PATENT DOCUMENTS

| | | | |
|---|---|---|---|
| 9,304,775 B1 | 4/2016 | Lindholm et al. | |
| 9,483,235 B2 | 11/2016 | Murphy et al. | |
| 9,607,355 B2 | 3/2017 | Zou et al. | |
| 9,703,573 B1 * | 7/2017 | Giefers | G06F 9/4484 |
| 10,019,668 B1 | 7/2018 | Woo | |
| 10,045,061 B2 * | 8/2018 | Kim | H04N 21/4122 |
| 10,558,500 B2 | 2/2020 | Goldsack et al. | |
| 10,698,737 B2 | 6/2020 | Fachini et al. | |
| 11,556,382 B1 * | 1/2023 | Byagowi | G06F 9/4881 |
| 2011/0072234 A1 * | 3/2011 | Chinya | G06F 12/1036 |
| | | | 711/E12.001 |
| 2016/0210550 A1 | 7/2016 | Merrill et al. | |
| 2018/0046913 A1 | 2/2018 | Yu et al. | |
| 2018/0095750 A1 * | 4/2018 | Drysdale | G06F 9/50 |
| 2018/0285726 A1 | 10/2018 | Baum et al. | |
| 2019/0303159 A1 * | 10/2019 | Fryman | G06F 9/3004 |
| 2020/0081850 A1 * | 3/2020 | Singh | G06F 13/1673 |
| 2020/0202058 A1 | 6/2020 | Yu et al. | |
| 2022/0151022 A1 * | 5/2022 | Chikkur Dattatraya | |
| | | | H04L 69/323 |

FOREIGN PATENT DOCUMENTS

| | | | | |
|---|---|---|---|---|
| CN | 109299173 A | * | 2/2019 | H04L 67/06 |
| CN | 110231986 A | * | 9/2019 | G06F 15/7871 |
| KR | 10-2017-0012019 A | | 2/2017 | |
| KR | 10-2105681 B1 | | 4/2020 | |
| KR | 10-2137802 B1 | | 7/2020 | |
| WO | WO-2009142628 A1 | * | 11/2009 | H04L 41/14 |

OTHER PUBLICATIONS

Zhang et al. CN107798117A Description Translation, Mar. 3, 2018, https://worldwide.espacenet.com/publicationDetails/description?CC=CN&NR=107798117A&KC=A&FT=D&ND=3&date=20180313&DB=&locale=en_EP, pp. 1-21 (Year: 2018).*

Park, CN106453477A Description Translation, Feb. 22, 2017, https://worldwide.espacenet.com/publicationDetails/description?CC=CN&NR=106453477A&KC=A&FT=D&ND=3&date=20170222&DB=&locale=en_EP, pp. 1-9 (Year: 2017).*

Ma et al. CN110231986A Description Translation, Sep. 13, 2019, https://worldwide.espacenet.com/publicationDetails/description?CC=CN&NR=110231986A&KC=A&FT=D&ND=3&date=20190913&DB=&locale=en_EP, pp. 1-32 (Year: 2019).*

Xiao, CN109299173A Description Translation, Feb. 1, 2019, <https://worldwide.espacenet.com/publicationDetails/description?CC=CN&NR=109299173A&KC=A&FT=D&ND=3&date=20190201&DB=&locale=en_EP>, pp. 1-9 (Year: 2019).*

Google, Google TPU, "Empowering Businesses with Google Cloud AI" https://cloud.google.com/tpu (12 pages in English).

"NVIDIA DGX-2 the World's Most Powerful Deep Learning System for the Most Complex AI Challenges." NVIDIA, Jul. 2019 (2 pages in English).

Li, Youjie, et al., "A Network-Centric Hardware/Algorithm Co-Design to Accelerate Distributed Training of Deep Neural Networks." 2018 51st Annual IEEE/ACM International Symposium on Microarchitecture (MICRO). IEEE, 2018 (14 pages in English).

Chung, Eric, et al., "Serving DNNs in Real Time at Datacenter Scale with Project Brainwave." iEEE Micro 38.2 (2018): 8-20 (11 pages in English).

Robinson, Jamal, "FPGAs, Deep Learning, Software Defined Networks and the Cloud: A Love Story Part 1", Nov. 12, 2017 (8 pages in English).

Park, Jongse, et al. "Scale-Out Acceleration for Machine Learning." Proceedings of the 50th Annual IEEE/ACM International Symposium on Microarchitecture. 2017 (15 pages in English).

Firestone, Daniel, et al., "Azure Accelerated Networking: Smartnics in the Public Cloud." 15th Symposium on Networked Systems Design and Implementation ({NSDI} 18). 2018 (15 pages in English).

Nowatzki, Tony, et al., "Stream-Dataflow Acceleration." 2017 ACM/IEEE 44th Annual International Symposium on Computer Architecture (ISCA) (14 pages in English).

* cited by examiner

ELECTRONIC DEVICE INCLUDING ACCELERATORS OF HETEROGENEOUS HARDWARE TYPES FOR SCHEDULING OPERATION

CROSS-REFERENCE TO RELATED APPLICATIONS

This application claims the benefit under 35 USC § 119(a) of Korean Patent Application No. 10-2021-0028358 filed on Mar. 3, 2021, in the Korean Intellectual Property Office, the entire disclosure of which is incorporated herein by reference for all purposes.

BACKGROUND

1. Field

The following description relates to an electronic device including accelerators of heterogeneous hardware types.

2. Description of Related Art

With developments in artificial intelligence (AI), there is a growing need for hardware dedicated to AI. For example, AI may perform inference or learning through an operation. Various devices are being developed as dedicated hardware for implementing and executing AI.

The dedicated hardware for AI may be implemented by a central processing unit (CPU) and a graphics processing unit (GPU), and an application-specific integrated circuit (ASIC) and a field-programmable gate array (FPGA) that may be repurposed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: a host processor configured to control an operation of the electronic device; accelerators of heterogeneous hardware types configured to exchange data with each other through direct communication; and a control unit configured to convert a command received from the host processor, based on a type of each of the accelerators and transfer a result of the converting to a corresponding accelerator among the accelerators.

The electronic device may further include an interconnect switch configured to manage direct communication between the accelerators without interference by the host processor and a software stack.

The control unit may be further configured to perform an interface translation on a command received from the host processor based on an interface difference between the accelerators and transfer a result of the interference translation to a corresponding accelerator, without interference by the host processor and a software stack.

The control unit may be further configured to: divide the operation into a data receiving operation, a data processing operation, and a data transferring operation; divide each of the data receiving operation, the data processing operation, and the data transferring operation into sub-operations; and perform scheduling on the sub-operations for one or more of the accelerators based on a dependency between the sub-operations and characteristics of the sub-operations.

The control unit may be further configured to perform scheduling on the sub-operations for one or more of the accelerators based on complexity, repeatability, execution time, or any combination of any two or more of complexity, repeatability, and execution time.

The accelerators may include any combination of any two or more of an application-specific integrated circuit (ASIC), a field-programmable gate array (FPGA), a graphics processing unit (GPU), a central processing unit (CPU), a neural processing unit (NPU), a tensor processing unit (TPU), and a digital signal processor (DSP).

In another general aspect, an electronic device includes: a host processor configured to control an operation of the electronic device; accelerators of heterogeneous hardware types configured to exchange data with each other through direct communication; and an interconnect switch configured to manage direct communication between the accelerators without interference by the host processor and a software stack.

The electronic device may further include a control unit configured to convert a command received from the host processor based on a type of each of the accelerators and transfer a result of the converting to a corresponding accelerator among the accelerators.

The control unit may be further configured to perform an interface translation on the command received from the host processor based on an interface difference between the accelerators and transfer a result of the interface translation to the corresponding accelerator, without interference by the host processor and a software stack.

The control unit may be further configured to: divide the operation into a data receiving operation, a data processing operation, and a data transferring operation; divide each of the data receiving operation, the data processing operation, and the data transferring operation into sub-operations; and perform scheduling on the sub-operations for one or more of the accelerators based on a dependency between the sub-operations and characteristics of the sub-operations.

The control unit may be further configured to perform scheduling on the sub-operations for one or more of the accelerators based on complexity, repeatability, execution time, or any combination of any two or more of complexity, repeatability, and execution time.

The accelerators may include any combination of any two or more of an application-specific integrated circuit (ASIC), a field-programmable gate array (FPGA), a graphics processing unit (GPU), and a central processing unit (CPU).

In another general aspect, an electronic device includes: a host processor configured to control an operation of the electronic device; accelerators of heterogeneous hardware types configured to exchange data with each other through direct communication; and a control unit. The control unit is configured to: perform scheduling on an operation to be executed in the accelerators for the accelerators; divide the operation into a data receiving operation, a data processing operation, and a data transferring operation; divide each of the data receiving operation, the data processing operation, and the data transferring operation into sub-operations; and perform scheduling on the sub-operations for one or more of the accelerators based on a dependency between the sub-operations and characteristics of the sub-operations.

The control unit may be further configured to convert a command received from the host processor based on a type of each of the accelerators and transfer a result of the converting to a corresponding accelerator among the accelerators.

The electronic device may further include an interconnect switch configured to manage direct communication between the accelerators without interference by the host processor and a software stack.

The electronic device may be configured such that, as the control unit divides each of the data receiving operation, the data processing operation, and the data transferring operation into the sub-operations, an accelerator, among the accelerators, is configured to: receive first sub-data at a first time point; process the first sub-data at a second time point; and process second sub-data, receive third sub-data, and transfer the processed first sub-data at a third time point.

At least two accelerators among the accelerators may be configured to communicate with each other without interference by the host processor and a software stack.

Other features and aspects will be apparent from the following detailed description, the drawings, and the claims.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
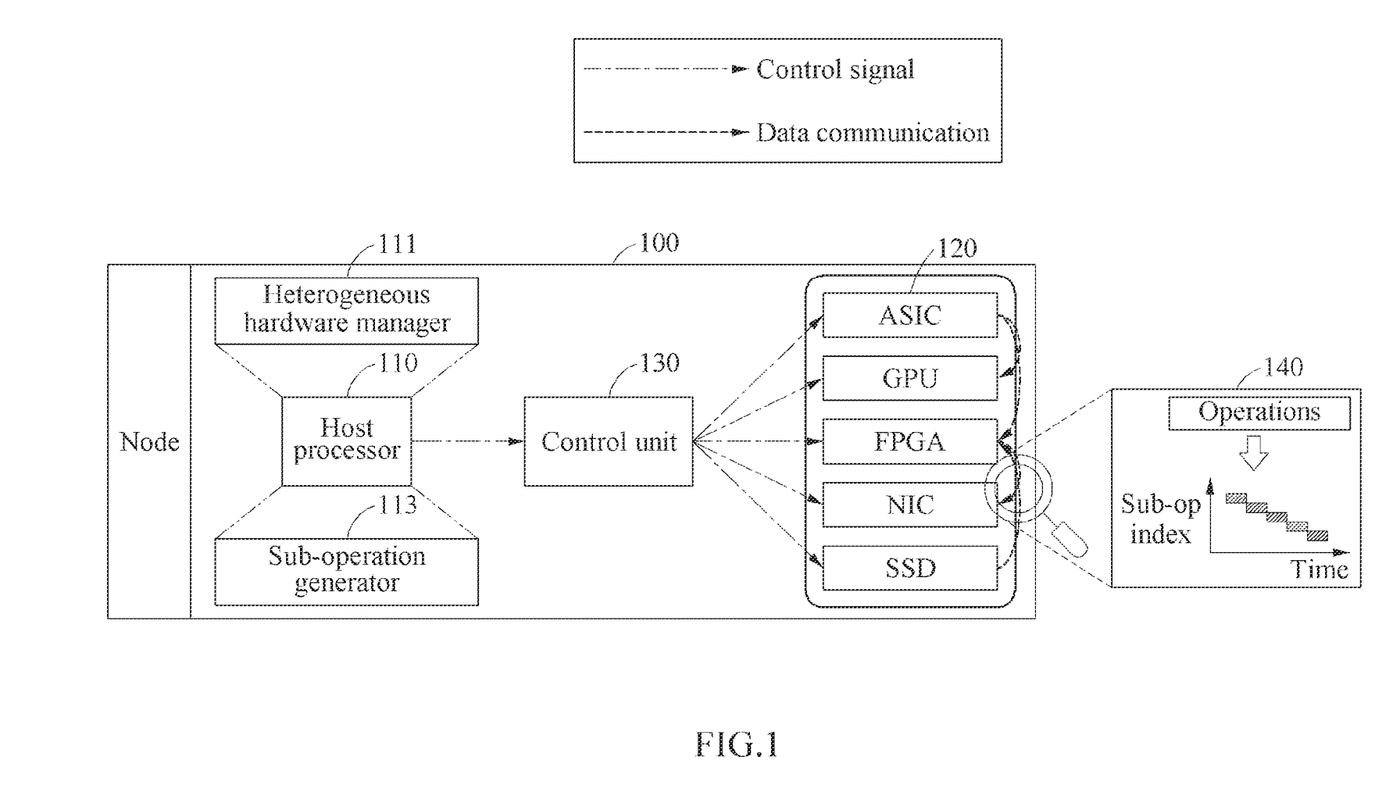
FIG. 1 illustrates an example of an electronic device.

FIG. 1 illustrates an example of an electronic device.

Referring to FIG. 1, an electronic device 100 may include a host processor 110, accelerators 120, a control unit (or controller) 130, and an interconnect switch (not shown). The electronic device 100 may be designed as a single node in which one host processor controls and/or manages a plurality of accelerators. The electronic device 100 designed as a single node may be easier to manage, and may have a lower cost and high performance compared to an electronic device designed as a plurality of nodes. The accelerators 120 may be accelerators of heterogeneous hardware types in the single node, and may thus have high performance and flexibility by utilizing an effective point of each of the accelerators 120. For example, the electronic device 100 may perform distributed processing on a neural network-based workload (or an application program, etc.) using the accelerators 120.

The host processor 110 may be a device configured to control operations of the electronic device 100 and the components of the electronic device 100. The host processor 100 may include, for example, a central processing unit (CPU). The host processor 110 may control the operations of the various components included in the electronic device 100 based on an operating system (OS) of the electronic device 100. For example, when the host processor 110 receives one or more requests to execute a neural network in one or more accelerators, and may transmit, to the one or more accelerators, a command corresponding to the requests through the control unit 130. A request described herein may be for neural network training or neural network-based inference. The neural network may include a model that performs, for example, pattern recognition (e.g., object recognition, face identification, etc.), sequence recognition (e.g., voice, gesture, and handwritten text recognition, machine translation, machine interpretation, etc.), control (e.g., vehicle control, process control, etc.), recommendation services, decision making, medical diagnoses, financial applications, data mining, and the like. However, examples the neural network is not limited to the listed examples.

The host processor 110 may include a heterogeneous hardware manager 111 configured to manage and/or control the accelerators 120. The heterogeneous hardware manager 111 may be implemented as software, and may be provided in a form of a framework or a library, for example. The host processor 110 may also include a sub-operation generator 113. The sub-operation generator 113 may be software that divides an operation into a plurality of sub-operations for sub-operation scheduling 140, which will be described in more detail later.

The accelerators 120 may be hardware devices for executing the neural network, and may be separate processors distinguished from the host processor 110. For example, the accelerators 120 may be a combination of any two or more of an application-specific integrated circuit (ASIC), a field-programmable gate array (FPGA), a graphics processing unit (GPU), a CPU, a neural processing unit (NPU), a tensor processing unit (TPU), and a digital signal processor (DSP).

An accelerator described herein may perform a task or operation that may be more efficiently processed by a separate dedicated processor (e.g., the accelerator) than by the host processor 110, which is a universal processor based on characteristics of neural network-based operations. For example, one or more processing elements (PEs) and an on-chip memory that are included in the accelerator may be used for the task operation. The on-chip memory may include, for example, a scratchpad memory accessible through an address space, a static random-access memory (SRAM), and the like.

The neural network may include a plurality of layers. For example, the neural network may include an input layer, a plurality of hidden layers, and an output layer. Each of the layers may include a plurality of nodes, each of which may be referred to as an artificial neuron. Each node may be a computation unit having one or more inputs and outputs, and the nodes may be interconnected. A weight may be set for a connection between the nodes, and the weight may be adjusted or changed. The weight may increase, decrease, or maintain an associated data value to determine a degree of impact of the data value on a final result. Weighted inputs of nodes included in a previous layer may be input to each node included in the output layer. Such a process in which weighted data is input from a layer to a next layer may be referred to as propagation.

A data storage device may be a hardware device configured to store data, and may include, for example, a memory and a storage. The memory may be a hardware device configured to allow short-term data access and may include, for example, a dynamic random-access memory (DRAM). The storage may be a hardware device configured to allow long-term data access and may include, for example, a solid-state drive (SSD) and/or a hard disk drive (HDD). Data stored in the memory may be loaded based on an address of the data and may then be processed by corresponding processors or accelerators. In contrast, data stored in the storage may need to be processed through data processing in order to be processed by corresponding processors or accelerators. The data storage device may store data that is needed for the accelerators 120 to perform neural network-based processing. The stored data may be transferred to the accelerators 120 through direct communication between devices, without passing through the host processor 110, thereby effectively reducing the processing burden of the host processor 110.

The control unit 130 may convert a command received from the host processor 110 based on a type of each of the accelerators 120 and transfer a converted command to a corresponding accelerator. As described above, the accelerators 120 may be devices of heterogeneous hardware types that have different interface methods. Thus, the control unit 130 may convert the command received from the host processor 110 to an interface form that is suitable for each accelerator, and transfer the interface form to a corresponding accelerator. That is, the control unit 130 may reduce or minimize an interface difference between heterogeneous devices and eliminate communication between device drivers in software. The control unit 130 will be further described in FIG. 4.

The interconnect switch may manage direct communication between the accelerators 120 without interference by the host processor 110. The interconnect switch may eliminate a kernel access overhead, and thus enable direct communication with which an interconnect bandwidth between the devices may be more effectively used. The interconnect switch will be further described in FIG. 3.

Through sub-operation scheduling 140, an operation to be performed may be divided into sub-operations, and an accelerator suitable for a characteristic of each of the sub-operations may perform a corresponding sub-operation. Thus, the performance of the electronic device 100 may be maximized. The sub-operation scheduling 140 will be further described in FIG. 5.

Figure 2:
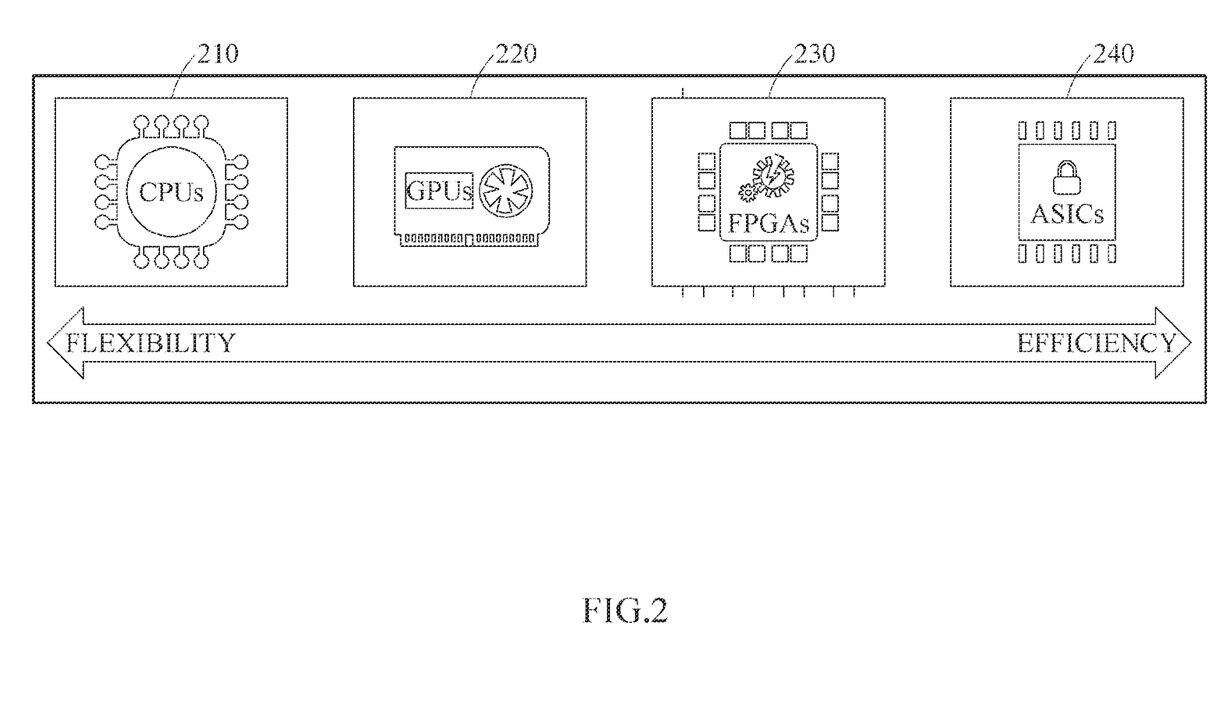
FIG. 2 illustrates an example of accelerators of heterogeneous hardware types.

FIG. 2 illustrates an example of accelerators of heterogeneous hardware types. More specifically, FIG. 2 illustrates an example of characteristics of accelerators.

Referring to FIG. 2, a CPU 210 may be a universal processor configured to decode and execute commands, and may have relatively higher flexibility but lower efficiency than other devices.

A GPU 220 may be a processor for a particular purpose (e.g., image processing), and may have lower flexibility than the CPU 210 but higher flexibility than most of the other devices. The GPU 220 may be programmable to be applied to various fields, although it has lower performance than an ASIC 240. The GPU 220 may design a data path for general functions which are not specific ones, and, thus, may process various functions using numerous general arithmetic logic units (ALUs). Although the GPU 220 may process various functions using the general ALUs, the GPU 220 may have relatively lower efficiency than devices such as the ASIC 240, which accelerates specific functions. In addition, the GPU 220 may efficiently accelerate a function (or a parallel function, etc.) that is friendly to the GPU 220, and thus have lower flexibility than the CPU 210.

An FPGA 230 may be an accelerator that uses a programmable non-memory semiconductor having a circuit that is redesigned according to a purpose, which is dissimilar to a general semiconductor having an unchangeable circuit. The FPGA 230 may have lower flexibility but higher efficiency than the GPU 220, and higher flexibility but lower efficiency than the ASIC 240.

The ASIC 240 may be an accelerator that uses an application-specific semiconductor designed for a specific purpose and may thus be designed to be highly optimized for a specific function. For example, the ASIC 240 may accelerate a pattern that is repeatedly performed in an application and operate with higher performance, higher efficiency, and lower power than other accelerators. Although the ASIC 240 may be highly efficient for a specific function, the ASIC 240 may have low flexibility because it is not readily applicable to other functions. The ASIC 240 may be optimized for a specific function at the expense of generality in an internal circuit, and may not be readily applicable to other functions. For example, in the case of a neural network, a matrix multiplication may account for most of an operation time, and thus an ASIC configured to accelerate such a matrix multiplication may be designed to be used for an operation.

As described above, there may be a trade-off between flexibility and efficiency of accelerators. Using an optimal accelerator to perform an operation in consideration of the characteristics described in the foregoing discussion, the performance of an electronic device may be improved 100. For example, the ASIC 240 may be used for an operation that is complex and frequently repeated, and has a long execution time. In contrast, the GPU 220 may be used for an operation that is simple and infrequently repeated, and has a short execution time. In a case in which a new operation is requested, the GPU 220 and the FPGA 230, which are programmable, may be used first to execute the new operation. When the operation is frequently requested and more execution time elapses, the ASIC 240 that is dedicated to the operation may be newly constructed and added to an electronic device. In this case, the operation may be performed in the newly added ASIC 240 instead of the GPU 220 and the FPGA 230, thereby continuously improving the performance of the electronic device. This process may be described as follows.

In a first phase (e.g., phase 1), an initial deployment may be performed. A function structure and an execution time of a target application may be profiled. Among functions, a function that is relatively structured and has a long execution time may be determined to be executed in the ASIC 240, and a function that is irregular and has a short execution time may be determined to be executed in a programmable accelerator. The programmable accelerator may include, for example, the GPU 220, the FPGA 230, and a smart network interface card (NIC) to which an operation function is added.

In a second phase (e.g., phase 2), a system refinement may be performed. A function structure and an execution time of an original or additional application may be profiled. A proportion of a type of accelerators included in an electronic device may be adjusted based on a change in a proportion of functions being executed. When a new function is found, an optimal programmable accelerator that supports the new function may be selected through profiling.

In a third phase (e.g., phase 3), a system replacement may be performed. Based on a combination of one or both of complexity and repeatability of a new function, it may be determined whether to add the ASIC 240 that supports the function. When it is determined to add the ASIC 240, the ASIC 240 may be added to the electronic device to execute the function.

Figure 3:
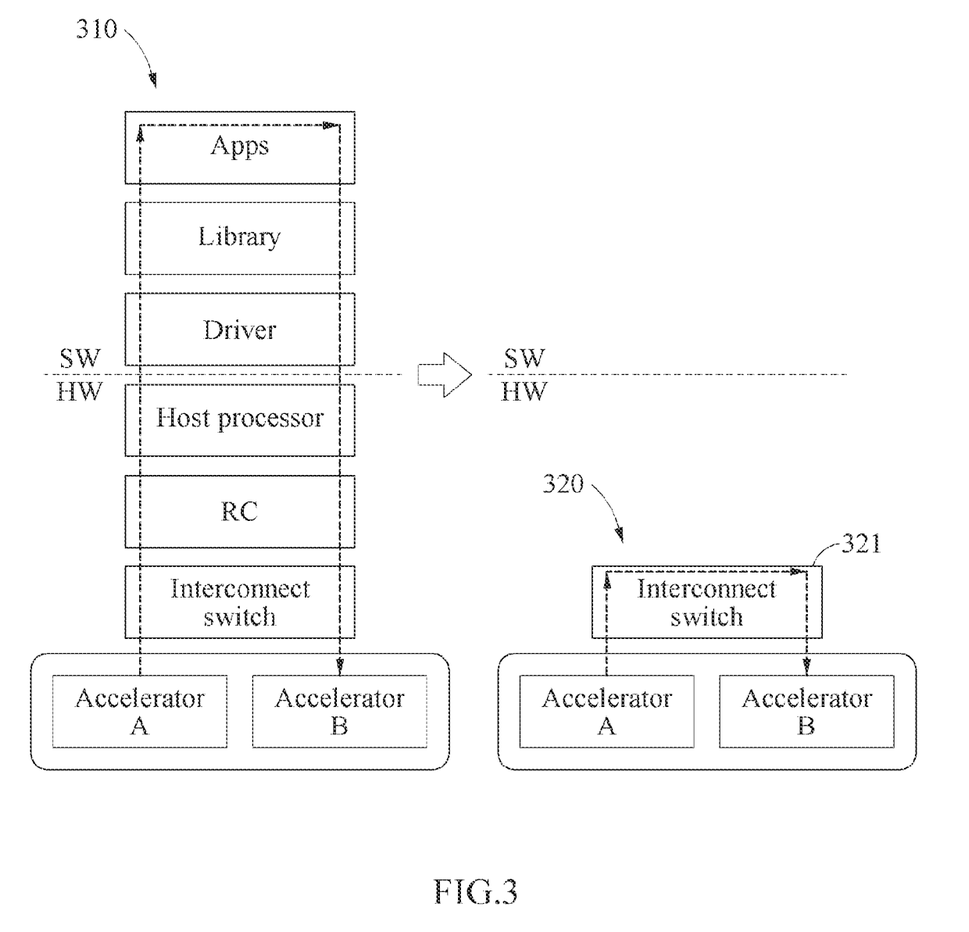
FIG. 3 illustrates an example of an interconnect switch.

FIG. 3 illustrates an example of an interconnect switch. More specifically, FIG. 3 illustrates an example of an operation of an interconnect switch configured to manage direct communication between accelerators is illustrated. In the example of FIG. 3, accelerators A and B may be devices of heterogeneous hardware types.

A first case 310 may indicate passing numerous hardware stacks and software stacks for direct communication between the accelerators A and B. In a case in which an electronic device is configured using heterogeneous accelerators, the performance of the electronic device may be limited due to frequent data synchronizations between the accelerators. A synchronization used herein may refer to a process of transferring input and output of a function to be performed by each of the accelerators A and B. In the first case 310, to transfer data from the accelerator A to the accelerator B, the hardware stacks such as an interconnect switch, a remote control (RC), a host processor, and the like, and the software stacks such as a driver, a library, an application, and the like may need to be used. Due to such a long data path, a significant synchronization overhead may occur, and an interconnect bandwidth may thus be inefficiently used.

A second case 320 may indicate performing direct communication between the accelerators A and B through an interconnect switch 321. Unlike the interconnect switch in the first case 310, the interconnect switch 321 may have an operation ability that directly controls a communication method. The interconnect switch 321 may be a hardware device in which a protocol conversion function is implemented through the operation ability. The interconnect switch 321 may manage and/or support direct communication between the accelerators A and B without interference by a host processor or a software stack. In the second case 320, there is no interference in the direct communication, except for the interconnect switch 321 and the accelerators A and B that actually perform the communication, and thus a data path may be short and an interconnect bandwidth may be efficiently used. Also, since the host processor may not affect direct communication, the host processor may process another task that improves the overall performance of the electronic device.

Figure 4:
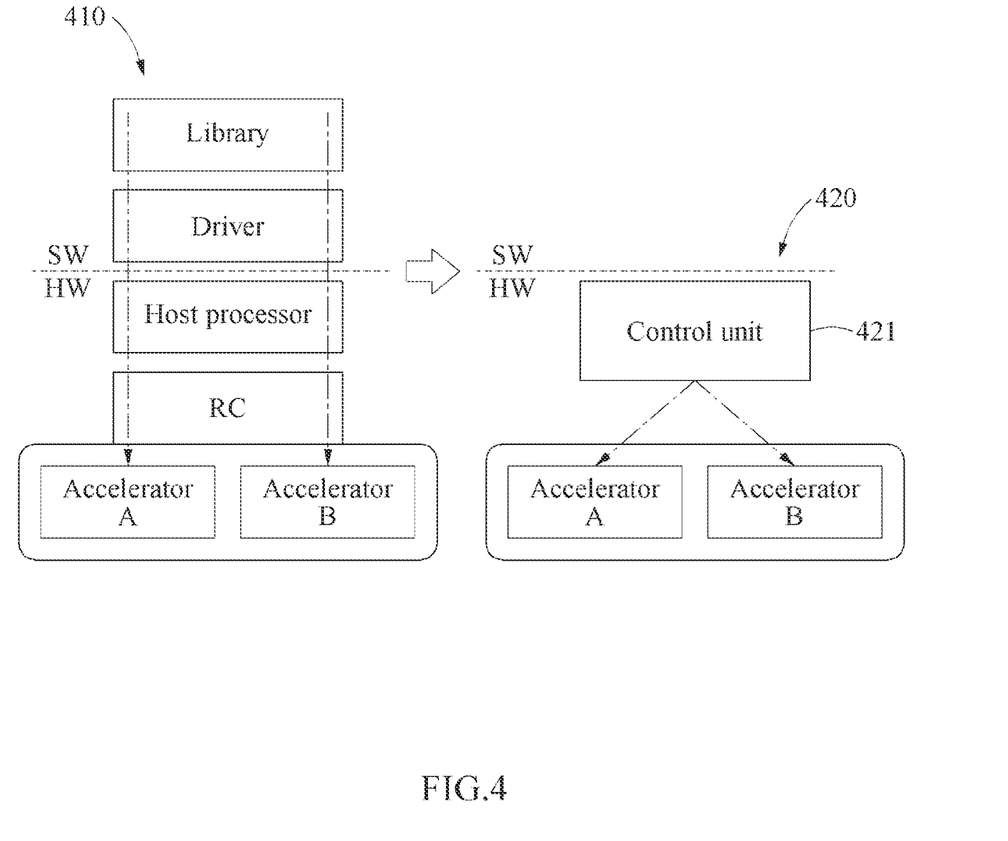
FIG. 4 illustrates an example of a control unit.

FIG. 4 illustrates an example of a control unit. More specifically, FIG. 4 illustrates an example of a process of improving efficiency of an interconnect bandwidth through a control unit. In the example of FIG. 4, accelerators A and B may be devices of heterogeneous hardware types.

A first case 410 may indicate passing numerous hardware stacks and software stacks to transfer a command (or a control signal) to the accelerators A and B that are based on different interfaces. For example, an NIC may operate based on a command queue-type interface, and a GPU may operate based on a memory mapped input and output (I/O)-type interface. For communication between the accelerators A and B that are based on different interfaces, an interface translation may be needed. The interface translation may be performed by a host processor. As illustrated in FIG. 4, the software stacks such as a library and a driver, and the hardware stacks such as the host processor and an RC may be needed. Thus, the utilization of an interconnect bandwidth may be reduced.

A second case 420 may indicate using a control unit 421 to transfer a command to the accelerators A and B that are based on different interface. The command may include various sets of data transferred as a control signal to each of the accelerators A and B. The control unit 421 may be a device that is distinguished from the host processor in the first case 410 and has a separate operation ability, which may be a hardware control device using an internal logic. For example, the control unit 421 may be implemented as an FPGA or an interconnect switch, but examples of the control unit 421 may not be limited thereto. The control unit 421 may perform the interface translation described above using the internal logic without interference by the host processor and a software stack. For example, the control unit 421 may perform the interface translation on a command received from the host processor 110 of FIG. 1, and transfer a result of the interface translation to a corresponding accelerator. The control unit 421, which is a hardware device, may perform the interface translation, thereby improving the overall performance of an electronic device by reducing a control path and improving the efficiency of an interconnect bandwidth.

Figure 5:
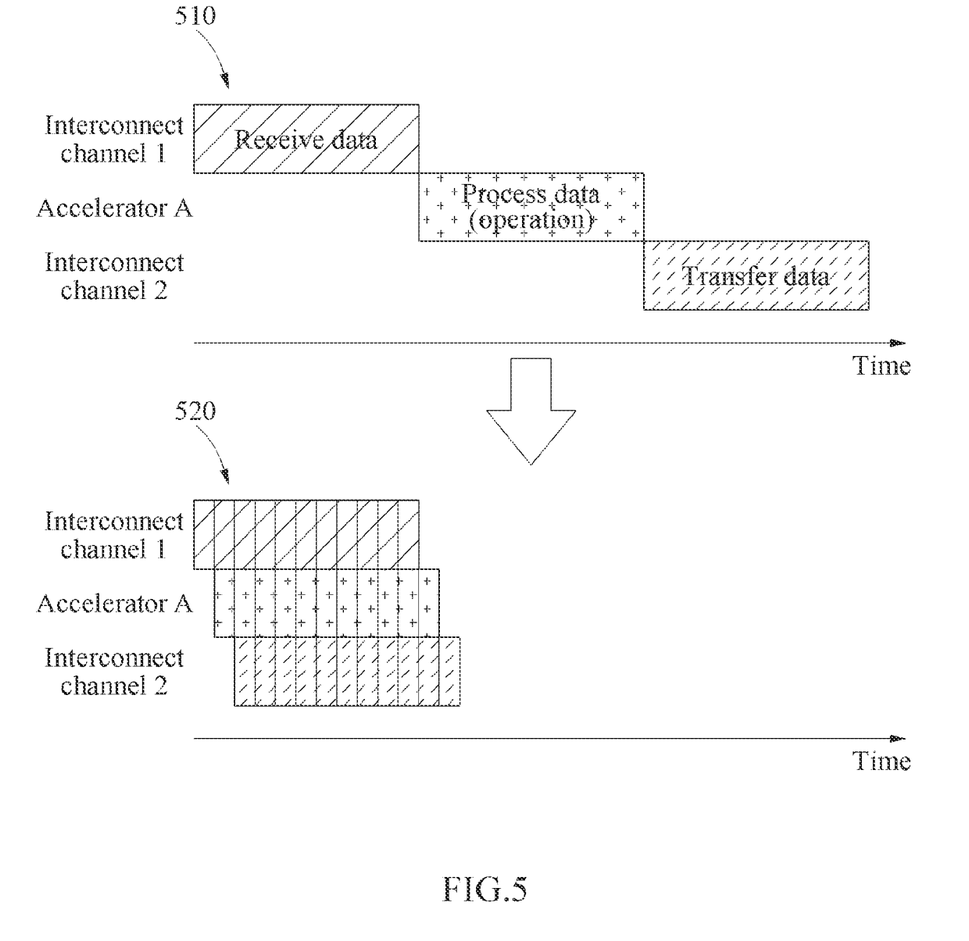
FIG. 5 illustrates an example of sub-operation scheduling.

FIG. 5 illustrates an example of sub-operation scheduling.

More specifically, FIG. 5 illustrates an example of a process of improving efficiency of data communication through sub-operation scheduling. In the example of FIG. 5, interconnect channels 1 and 2 may indicate communication channels between the accelerator A and other devices (e.g., accelerators, etc.). An operation performed in an accelerator A may be classified into an operation of receiving data to be processed, an operation of processing the received data, and an operation of transferring the processed data.

A first case 510 may indicate performing, at different times, a data receiving operation, a data processing operation, and a data transferring operation that are performed in the accelerator A. In other words, the accelerator A may receive entire data, process the received data, and then transfer the processed data after the processing is completed. As illustrated in FIG. 5, a great overall operation time may be used as the respective operations are performed at different times.

A second case 520 may indicate performing scheduling by dividing an operation to be performed by the accelerator A into a data receiving operation, a data processing operation, and a data transferring operation. In FIG. 5, a plurality of small boxes included in each operation in the second case 520 may indicate sub-operations of each operation. As each operation is divided into a plurality of sub-operations, the accelerator A may receive first sub-data at a first time point, process the first sub-data at a second time point, and transfer the processed first sub-data at a third time point. That is, at the third time point, the accelerator A may receive third sub-data, process second sub-data, and transfer the processed first sub-data. An interconnection between accelerators may support a bidirectional channel, and thus the overall performance of an electronic device may be improved using a bidirectional bandwidth. In addition, the accelerator A may concurrently perform data communication and data processing, and thus additionally improve the performance of an electronic device. Such sub-operation scheduling may be performed by being rapidly controlled by a control unit without interference by a host processor.

In an example, the control unit may verify a configuration of an electronic device. For example, the control unit may verify whether the bidirectional channel is present between accelerators and characteristics of the accelerators included in the electronic device. The control unit may also verify a dependency in an operation to be performed. For example, operations performed based on a batch or a channel in an algorithm may not have an interdependency therebetween, and thus be processed together. The control unit may divide the operation into the data receiving operation, the data processing operation, and the data transferring operation. The control unit may divide each of the operations into sub-operations. The control unit may then generate a graph indicating a dependency between the sub-operations. Such a dependency graph may refer to a graph that indicates, to perform a sub-operation, from which device data is to be received and then to which device the received data is to be transmitted after being processed. The control unit may perform sub-operation scheduling based on the dependency between the sub-operations and characteristics of the sub-operations.

Figure 6:
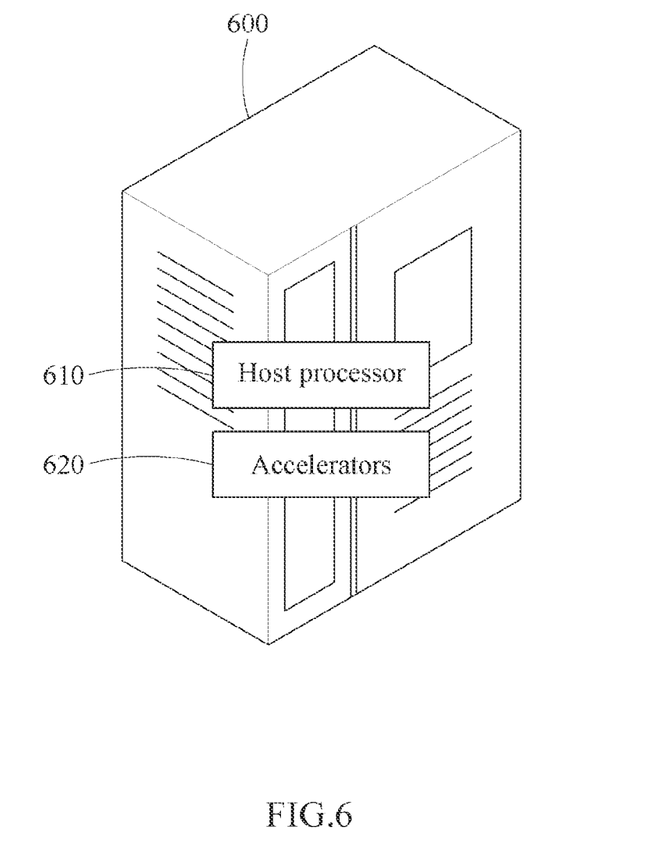
FIG. 6 illustrates an example of an electronic device.

FIG. 6 illustrates an example of an electronic device.

The electronic device described above may be applicable to various technical fields that connect a plurality of nodes including an operator and a memory such as artificial intelligence (AI) using multiple hardware, a database, a storage system, and the like, to configure a single system, and may thereby improve performance.

Referring to FIG. 6, the electronic device may be implemented as a server 600. Although the electronic device is illustrated as the server 600 in FIG. 6 for convenience of description, various other examples may be applied without limitation.

The server 600 may include a host processor 610 and accelerators 620. The host processor 610 may control an operation of the server 600.

The accelerators 620 may be devices of heterogeneous hardware types configured to exchange data with each other through direct communication. The accelerators 620 may include, for example, a combination of any two or more of an ASIC, an FPGA, a GPU, a CPU, an NPU, a TPU, and a DSP.

The server 600 may further include a control unit (not shown) configured to convert a command received from the host processor 610 based on a type of each of the accelerators 620 and transfer a result obtained through the converting to a corresponding accelerator. The control unit may perform an interface translation on the command received from the host processor 610 based on an interface difference between the accelerators 620 without interference by the host processor 610 and a software stack, and transfer a result of the interference translation to the corresponding accelerator.

The control unit may divide each operation into a data receiving operation, a data processing operation, and a data transferring operation, and divide each of the data receiving operation, the data processing operation, and the data transferring operation into sub-operations, and perform scheduling on the sub-operations for one or more of the accelerators 620 based on a dependency between the sub-operations and characteristics of the sub-operations. The control unit may perform scheduling on the sub-operations for one or more of the accelerators 620 based on one or a combination of two or more of complexity, repeatability, and an execution time of the sub-operations. For example, the control unit may allocate a sub-operation that is relatively structured and has a long execution time among the sub-operations to an ASIC, and allocate a sub-operation that is irregular and has a short execution time among the sub-operations to a programmable accelerator.

The server 600 may further include an interconnect switch (not shown) configured to manage direct communication between the accelerators 620 without interference by the host processor 610 and the software stack.

In addition, the server 600 may process other operations described above.

The electronic device 100, the host processors 110 and 610, the accelerators 120, 620, A, and B, the control units 130 and 421, the CPUs 210, the GPUs 220, the FPGAs 230, the ASICs 240, the interconnect switch 321, the server 600, the CPUs, the GPUs, the FPGAs, the ASICs, the NICs, the SSDs, the host processors, the accelerators, the control units, the RCs, the interconnect switches, the processors, the memories, the storages, and other apparatuses, devices, units, modules, and components described herein with respect to FIGS. 1-6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random-access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
   accelerators of heterogeneous hardware types, comprising different interfaces, configured to exchange data with each other through direct communication; and
   a controller, without interference by a host processor and a software stack, configured to:
   perform an interface translation on a command corresponding to an operation received from the host processor, based on a type of each of the accelerators and an interface difference between the accelerators;
   transfer a result of the interface translation on the command to an accelerator corresponding to the command among the accelerators; and
   the accelerator corresponding to the command executes the transferred result of the interface translation on the command,
   wherein the accelerators and the controller are distinguished from the host processor that controls the electronic device,
   wherein among the accelerators there is an accelerator with a first interface type and an accelerator with a second interface type that is different than the first interface type which directly communicate with each other without interference by the host processor and the software stack.

2. The electronic device of claim 1, further comprising: an interconnect switch configured to manage the direct communication between the accelerators without interference by the host processor and the software stack.

3. The electronic device of claim 1, wherein the controller is further configured to:
   divide the operation into a data receiving operation, a data processing operation, and a data transferring operation;
   divide each of the data receiving operation, the data processing operation, and the data transferring operation into respective sub-operations; and
   perform scheduling of each of the sub-operations of the data receiving operation, the sub-operations of the data processing operation, and the sub-operations of the data transferring operation for one or more of the accelerators based on a dependency between the sub-operations of the data receiving operation, the sub-operations of the data processing operation, and the sub-operations of the data transferring operation and characteristics of the sub-operations of the data receiving operation, the sub-operations of the data processing operation, and the sub-operations of the data transferring operation.

4. The electronic device of claim 3, wherein the controller is further configured to:
   perform scheduling of each of the sub-operations of the data receiving operation, the sub-operations of the data processing operation, and the sub-operations of the data transferring operation for one or more of the accelerators based on complexity, repeatability, execution time of the sub-operations of the data receiving operation, the sub-operations of the data processing operation, and the sub-operations of the data transferring operation, or any combination of any two or more of complexity, repeatability, and execution time of the sub-operations of the data receiving operation, the sub-operations of the data processing operation, and the sub-operations of the data transferring operation.

5. The electronic device of claim 1, wherein the accelerators comprise any combination of any two or more of an application-specific integrated circuit (ASIC), a field-programmable gate array (FPGA), a graphics processing unit (GPU), a central processing unit (CPU), a neural processing unit (NPU), a tensor processing unit (TPU), and a digital signal processor (DSP).

6. The electronic device of claim 1, wherein the software stack comprises at least one of a driver, a library, and an application.

7. An electronic device, comprising:
   accelerators of heterogeneous hardware types with different interfaces configured to exchange data with each other through direct communication; and
   an interconnect switch, configured to manage the direct communication between the accelerators without interference by a host processor and a software stack;
   a controller configured to, without interference by the host processor and the software stack, convert a command corresponding to an operation received from the host processor based on a type of each of the accelerators and transfer a result of the conversion of the command to an accelerator corresponding to the command among the accelerators;
   the accelerator corresponding to the command executes the transferred result of the conversion of the command;
   wherein the accelerators and the interconnect switch are distinguished from the host processor that controls the electronic device, and
   wherein among the accelerators there is an accelerator with a first interface type and an accelerator with a second interface type that is different than the first interface type which directly communicate with each other without interference by the host processor and the software stack.

8. The electronic device of claim 7, wherein the controller is further configured to:
   perform an interface translation on the command received from the host processor based on an interface difference between the accelerators; and
   transfer a result of the interface translation on the command to the accelerator corresponding to the command.

9. The electronic device of claim 7, wherein the controller is further configured to:
   divide the operation into a data receiving operation, a data processing operation, and a data transferring operation;
   divide each of the data receiving operation, the data processing operation, and the data transferring operation into respective sub-operations; and
   perform scheduling of each of the sub-operations of the data receiving operation, the sub-operations of the data processing operation, and the sub-operations of the data transferring operation for one or more of the accelerators based on a dependency between the sub-operations of the data receiving operation, the sub-operations of the data processing operation, and the sub-operations of the data transferring operation and characteristics of the sub-operations of the data receiving operation, the sub-operations of the data processing operation, and the sub-operations of the data transferring operation.

10. The electronic device of claim 9, wherein the controller is further configured to:
    perform scheduling of the sub-operations of the data receiving operation, the sub-operations of the data processing operation, and the sub-operations of the data transferring operation for one or more of the accelerators based on complexity, repeatability, execution time of the sub-operations of the data receiving operation, the sub-operations of the data processing operation, and the sub-operations of the data transferring operation, or any combination of any two or more of complexity, repeatability, and execution time of the sub-operations of the data receiving operation, the sub-operations of the data processing operation, and the sub-operations of the data transferring operation.

11. The electronic device of claim 7, wherein the accelerators comprise any combination of any two or more of an application-specific integrated circuit (ASIC), a field-programmable gate array (FPGA), a graphics processing unit (GPU), and a central processing unit (CPU).

12. The electronic device of claim 7, wherein the software stack comprises at least one of a driver, a library, and an application.

13. An electronic device, comprising:
accelerators of heterogeneous hardware types with different interfaces configured to exchange data with each other through direct communication; and
a controller, without interference by a host processor that controls the electronic device and without interference by a software stack, configured to:
  divide an operation into a data receiving operation, a data processing operation, and a data transferring operation;
  divide each of the data receiving operation, the data processing operation, and the data transferring operation into respective sub-operations;
  perform scheduling of each of the sub-operations of the data receiving operation, the sub-operations of the data processing operation, and the sub-operations of the data transferring operation for one or more of the accelerators based on a dependency between the sub-operations of the data receiving operation, the sub-operations of the data processing operation, and the sub-operations of the data transferring operation and characteristics of the sub-operations of the data receiving operation, the sub-operations of the data processing operation, and the sub-operations of the data transferring operation; and
the one or more of the accelerators execute the sub-operations of the data receiving operation, the sub-operations of the data processing operation, and the sub-operations of the data transferring operation,
wherein among the accelerators there is an accelerator with a first interface type and an accelerator with a second interface type that is different than the first interface type which directly communicate with each other without interference by the host processor and the software stack.

14. The electronic device of claim 13, wherein the controller is further configured to:
convert a command corresponding to the operation received from the host processor based on a type of each of the accelerators and transfer a result of the conversion of the command to an accelerator corresponding to the command among the accelerators.

15. The electronic device of claim 13, further comprising:
an interconnect switch configured to manage the direct communication between the accelerators without interference by the host processor and the software stack.

16. The electronic device of claim 13, wherein, as the controller divides each of the data receiving operation, the data processing operation, and the data transferring operation into the respective sub-operations, an accelerator, among the accelerators, is configured to:
  receive first sub-data at a first time point;
  process the first sub-data at a second time point; and
  process second sub-data, receive third sub-data, and transfer the processed first sub-data at a third time point.

17. The electronic device of claim 13, wherein the performance of the scheduling of each of the sub-operations of the data receiving operation, the sub-operations of the data processing operation, and the sub-operations of the data transferring operation is based on characteristics of the one or more of the accelerators.

18. The electronic device of claim 13, wherein the software stack comprises at least one of a driver, a library, and an application.

* * * * *